(12) United States Patent
Davies et al.

(10) Patent No.: US 8,011,462 B2
(45) Date of Patent: Sep. 6, 2011

(54) DETACHABLE FUEL CELL POWER UNIT FOR VEHICLE APPLICATIONS

(76) Inventors: Damian Davies, Nottinghamshire (GB); Jonathan Mark Moore, Leicestershire (GB); Nicholas Charles Talbot, London (GB); Benjamin N. Peace, Hathern (GB); Brook Forest Porter, Playa Vista, CA (US)

( * ) Notice: Subject to any disclaimer, the term of this patent is extended or adjusted under 35 U.S.C. 154(b) by 652 days.

(21) Appl. No.: 11/815,164
(22) PCT Filed: Jan. 30, 2006
(86) PCT No.: PCT/GB2006/000295
§ 371 (c)(1), (2), (4) Date: Sep. 8, 2008
(87) PCT Pub. No.: WO2006/082377
PCT Pub. Date: Aug. 10, 2006

(65) Prior Publication Data
US 2008/0314660 A1   Dec. 25, 2008

(30) Foreign Application Priority Data
Feb. 1, 2005 (GB) .................................. 0501989.8

(51) Int. Cl.
B60K 1/00 (2006.01)
B60K 16/00 (2006.01)
(52) U.S. Cl. .................... 180/65.31; 180/65.21
(58) Field of Classification Search ............... 180/65.1, 180/65.6, 65.28, 65.275, 220, 65.31, 65.21; 429/415, 434, 410, 22, 61
See application file for complete search history.

(56) References Cited

U.S. PATENT DOCUMENTS

| 4,650,729 A * | 3/1987 | Nakamura et al. ............. 429/61 |
| 5,595,949 A * | 1/1997 | Goldstein et al. ............. 423/220 |
| 6,458,189 B1 * | 10/2002 | Edlund et al. ....................... 96/7 |
| 6,516,623 B1 * | 2/2003 | Collier ........................ 62/238.7 |
| 6,692,859 B2 * | 2/2004 | Mukerjee et al. ............. 429/410 |
| 6,823,831 B2 * | 11/2004 | Chu et al. ................. 123/198 D |
| 7,063,912 B2 * | 6/2006 | Vuk et al. ...................... 429/434 |
| 7,105,243 B2 * | 9/2006 | Morishima et al. ........... 429/415 |
| 7,108,027 B2 * | 9/2006 | Horii ........................... 180/65.1 |

(Continued)

FOREIGN PATENT DOCUMENTS
EP   11 32 251   9/2001
(Continued)

OTHER PUBLICATIONS

Search Report from corresponding Great Britain Application No. GB0501989.8, mailed Feb. 28, 2006, 1 page.
(Continued)

Primary Examiner — Hau V Phan
(74) Attorney, Agent, or Firm — Mark H. Krietzman; Baker & Hostetler, LLP (57) ABSTRACT

A detachable and portable fuel cell power unit which may be used with a vehicle. Said power unit with a unitary housing containing: a fuel reservoir for storing fuel; at least one electrochemical fuel cell stack for delivering electrical power; a fueling port in an outer surface of the housing; and an airflow path extending between a first inlet port on an outer surface of the housing and a first outlet port on an outer surface of the housing, via cathode elements in the at least one fuel cell stack. Said unit includes a control circuit for interfacing with a power controller on the vehicle for determining allowable operating conditions.

12 Claims, 10 Drawing Sheets

U.S. PATENT DOCUMENTS

| | | | |
|---|---|---|---|
| 7,237,512 B2 * | 7/2007 | Iwashita et al. | 123/41.1 |
| 7,506,708 B2 * | 3/2009 | Iwashita | 180/65.1 |
| 2002/0041837 A1 * | 4/2002 | Edlund et al. | 422/177 |
| 2003/0134167 A1 | 7/2003 | Hirakata | |
| 2005/0016785 A1 | 1/2005 | Young | |
| 2005/0092538 A1 | 5/2005 | Baldwin | |
| 2007/0157815 A1 * | 7/2007 | Arai et al. | 96/108 |
| 2008/0296018 A1 * | 12/2008 | Zubrin et al. | 166/267 |
| 2009/0017349 A1 * | 1/2009 | Kohda | 429/22 |

FOREIGN PATENT DOCUMENTS

| | | |
|---|---|---|
| EP | 13 98 263 | 3/2004 |
| JP | 08-119180 | 5/1996 |
| JP | 2001315680 | 11/2001 |
| JP | 2001-351667 | 12/2001 |
| JP | 2002037167 | 2/2002 |
| JP | 2002246037 | 8/2002 |
| JP | 2002-321681 | 11/2002 |
| WO | WO2006/018317 | 2/2006 |

OTHER PUBLICATIONS

Moore, Bill, "Vectrix Readies for Launch", EV World—the Future in Motion, published Dec. 4, 2004, 3 pages.

Moore, Bill, "Vectrix Readies for Launch", EV World—the Future in Motion, published Dec. 4, 2004, 4 pages.

Written Opinion for PCT/GB2006/000295.

Search Report for PCT/GB2006/000295.

International Preliminary Report on Patentability for International Application PCT/GB2006/000295.

* cited by examiner

DETACHABLE FUEL CELL POWER UNIT FOR VEHICLE APPLICATIONS

The present invention relates to fuel cells and in particular to the use of fuel cells in vehicles.

There is increasing interest in the use of fuel cells as alternative sources of energy for various automotive applications. Fuel cells offer electrical power output from the electrochemical conversion of hydrogen and oxygen to water and therefore offer significant benefits in enabling substantial reduction in pollution at the point of use. Furthermore, fuel cells can be operated from a direct stored supply of hydrogen (e.g. bottled in compressed form), or from an indirect supply of hydrogen, (e.g. from a hydrogen-containing fuel from which the hydrogen is released by an associated fuel processor).

However, there are many associated problems to be overcome in applying fuel cell technology to automotive applications. These problems include: (i) providing sufficient power output for a given size and mass of fuel cell suitable for the vehicle, while maintaining adequate limits on the demands placed on the fuel cell according to variable operating, conditions, (ii) reducing the time to recharge or refuel the vehicle to an acceptable level comparable with existing vehicles powered by internal combustion engine; (iii) interlacing the fuel cells with the drive and control systems of the vehicle; and (iv) providing the fuel cell power unit in a package that is suited to the vehicle in question.

It is an object of the present invention to provide a versatile solution to providing, a fuel cell-based power unit for a vehicle in which some or all of the problems indicated above are mitigated or overcome.

According to one aspect, the present invention provides a fuel cell power unit for a vehicle, the fuel cell power unit comprising a unitary housing containing;
 a fuel reservoir for storing fuel;
 at least one electrochemical fuel cell stack for delivering electrical power from the fluid fuel;
 a refueling port in an outer surface of the housing; and
 an airflow path extending between a first inlet port on an outer surface of the housing and a first outlet port on an outer surface of the housing, via cathode elements in the at least one fuel cell stack.

Embodiments of the present invention will now be described by way of example and with reference to the accompanying drawings in which.

Figure 1:
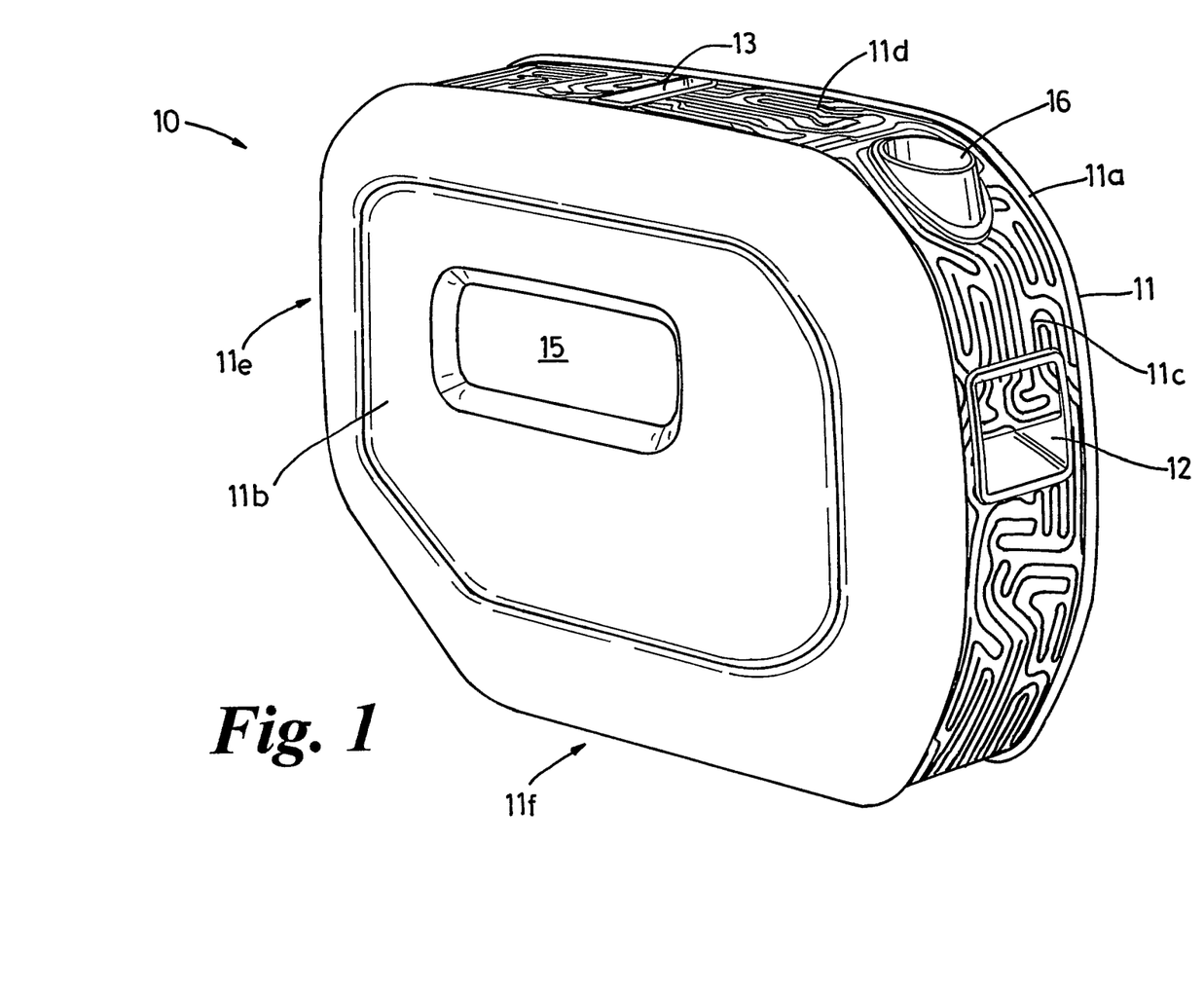
FIG. 1 shows a schematic perspective view of a fuel cell power unit suitable for use with a vehicle, such as a bike, and suitable for use in off-vehicle applications.

With reference to FIG. 1, there is shown a preferred compact style of fuel cell power unit 10 for use in a vehicle. The power unit 10 is particularly adapted to be removable from the vehicle so that it can be used as an alternative power source for other applications. Examples of such other applications may include providing domestic power for permanent or temporary accommodation, emergency power, mobile office power, outdoor lighting or generally running portable appliances such as portable computers etc. The removability of the power unit 10 also facilitates easy maintenance of the power unit by enabling the swapping of power units, or use of the same power unit in more than one vehicle. Swapping a discharged power unit 10 for a fully charged unit, or refilling the discharged unit eliminates the prolonged charging period associated with battery-powered electric vehicles.

Figure 4:
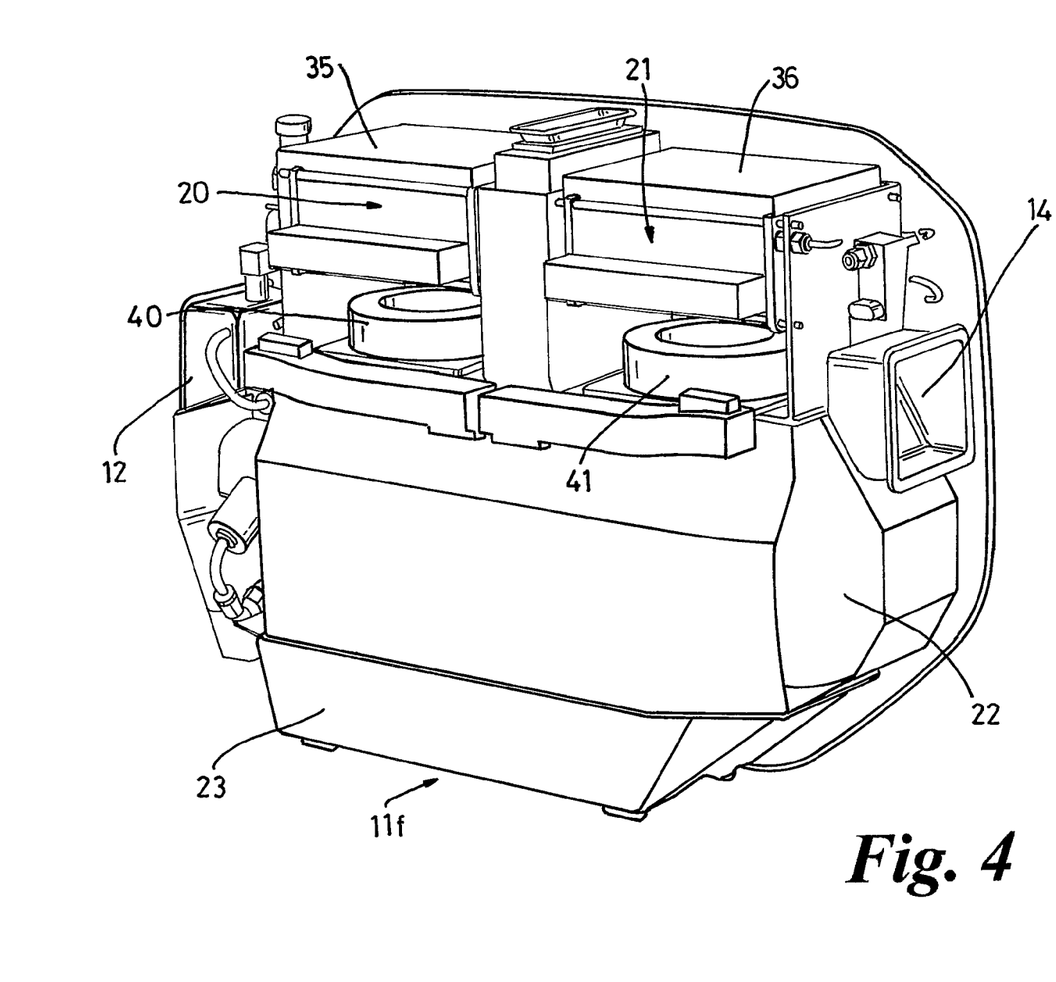
FIG. 4 shows a schematic perspective view of the reverse side of the fuel cell power unit of FIG. 1 with sides partially cut away to reveal internal detail.

The power unit 10 is also particularly adapted to integrate with the vehicle in which it is to be installed for optimum ease of use, versatility and efficiency. A unitary housing 11 includes side panels 11$a$, 11$b$, trailing edge panel 11$c$, top surface 11$d$, leading edge panel 11$e$ (see FIG. 4) and lower surface 11$f$ (see FIG. 4). The trailing edge panel 11$c$ includes a recessed handle 12 also serving as a first air inlet port. The leading edge panel 11$e$ also includes a recessed handle 14 also serving as a second air inlet port. The top surface 11$d$ also includes a recessed handle 13 which may also serve as a further air inlet port. One, or preferably both, side panels 11$a$, 11$b$ include an air outlet port 15. The exact disposition of air inlet and outlet ports may be varied according to different designs, and some or all of the inlet/outlet ports may serve as recessed handles. The top surface 11$d$ preferably also includes a refueling port 16 for easy access when the power unit is installed in the vehicle or when it is removed from the vehicle.

Figure 2:
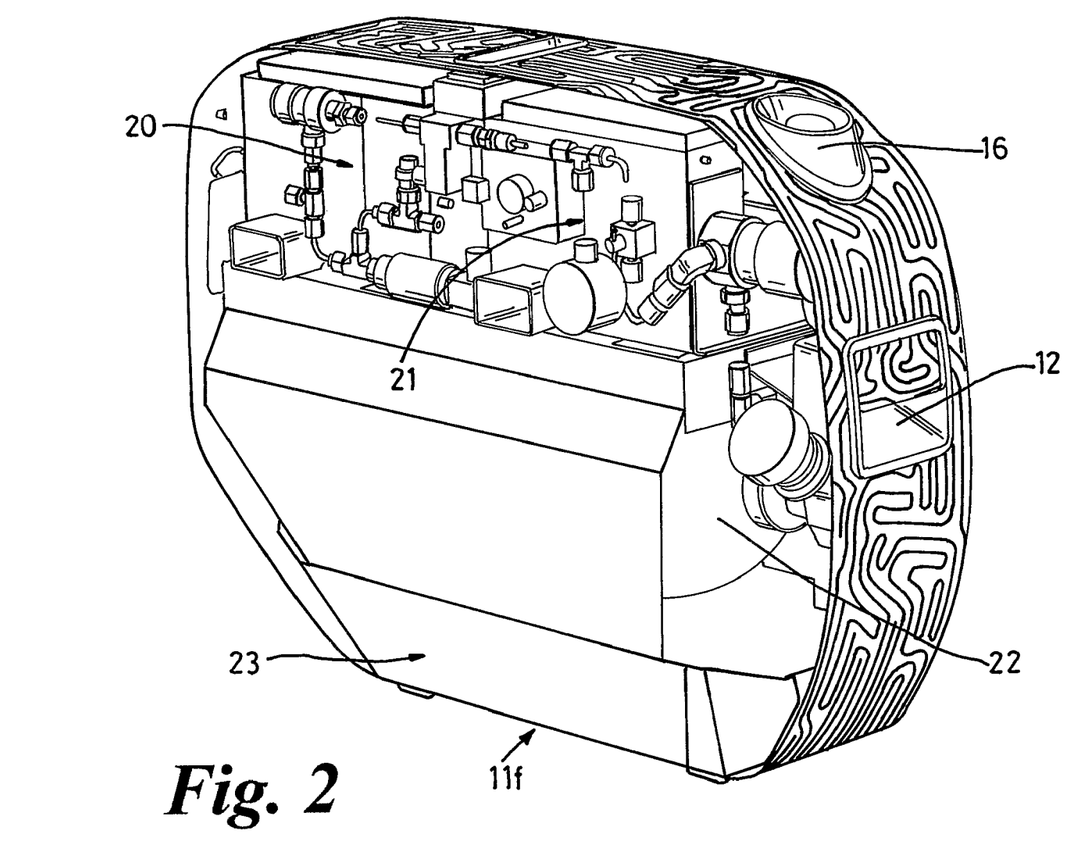
FIG. 2 shows a schematic perspective view of the fuel cell power unit of FIG. 1 with sides partially cut away to reveal internal detail.
Figure 3:
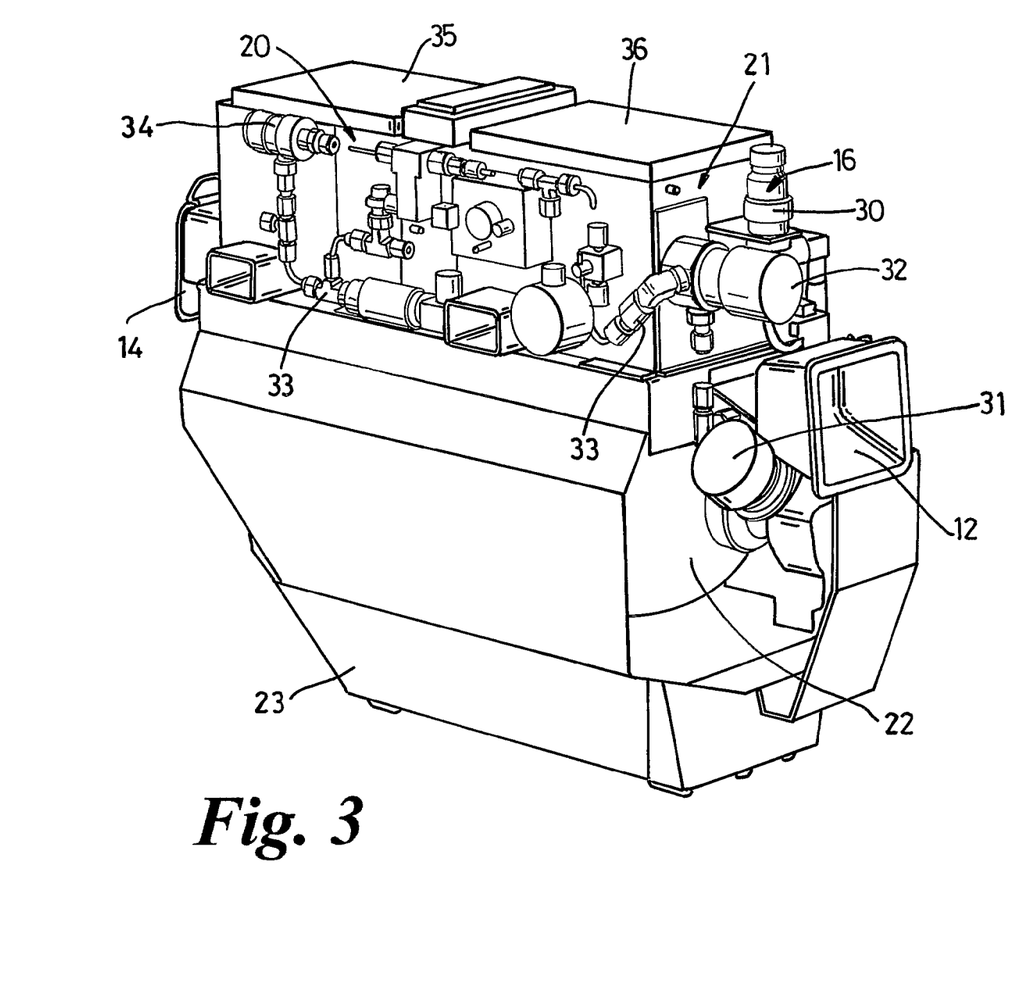
FIG. 3 shows a schematic perspective view of the fuel cell power unit of FIG. 1 with sides partially cut away to reveal internal detail.

With reference to FIGS. 2 and 3, the internal components of the fuel cell power unit 10 comprise a pair of fuel cell stacks 20, 21 and a fuel supply reservoir 22. In the preferred arrangement, the fuel supply reservoir 22 is a cylinder for storing compressed gaseous hydrogen. In other embodiments, indirect hydrogen source fuel types may be used, such as methanol, ethanol and sodium borohydride, contained within suitable reservoirs. Where such indirect hydrogen sources are used, the fuel cell stacks 20, 21 may be specially adapted fuel cells for use with such fuels (to include direct methanol fuel cells, solid oxide fuel cells, direct borohydride fuel cells etc.), or conventional hydrogen fuel proton exchange membrane cells in combination with a suitable fuel processor (not shown) for generating the hydrogen for delivery thereto. The fuel reservoir 22 is connected to the refueling port 16 by an appropriate conduit 30 and valve system 31. Fuel is delivered to each of the fuel cell stacks 20, 21 via a high pressure gas regulator 32 and fuel delivery pipes 33, and low pressure gas regulator 34.

Coolant and oxidant air is delivered to the fuel cell stacks 20, 21 from the air inlet port in recessed handles 12, 14. Preferably, the fuel cells 20, 21 are of the open cathode variety, in that air at ambient pressure is streamed over the fuel cell cathode plates to serve as (i) oxidant supply, (ii) as an exhaust carrier flow and (iii) as a coolant. To this end, the power unit provides an airflow path extending between the inlet port 12 and/or inlet port 14 around the fuel cell stacks 20, 21 and between the fuel cell plates via filters 35, 36. Depending upon the performance requirement of the fuel cells 20, 21, forced ventilation may be provided by way of fans 40, 41 to increase air flow between the fuel cell plates, as particularly shown in FIG. 4. Air is exhausted from the power unit 10 via air outlet port or ports 15. There may be an outlet port on one or both sides 11a, 11b (see also FIG. 5).

In preferred embodiments, to be described later, the fuel cell power unit 10 is positioned within a vehicle such that forward motion of the vehicle assists in providing forced air cooling and oxidant supply to the fuel cells via the airflow path.

The base of the power unit housing 11 includes an electrical control circuit 23 for controlling the operation of the fuel cells and for interfacing with a power controller on the vehicle in which the power unit 10 is to be installed.

Figure 5:
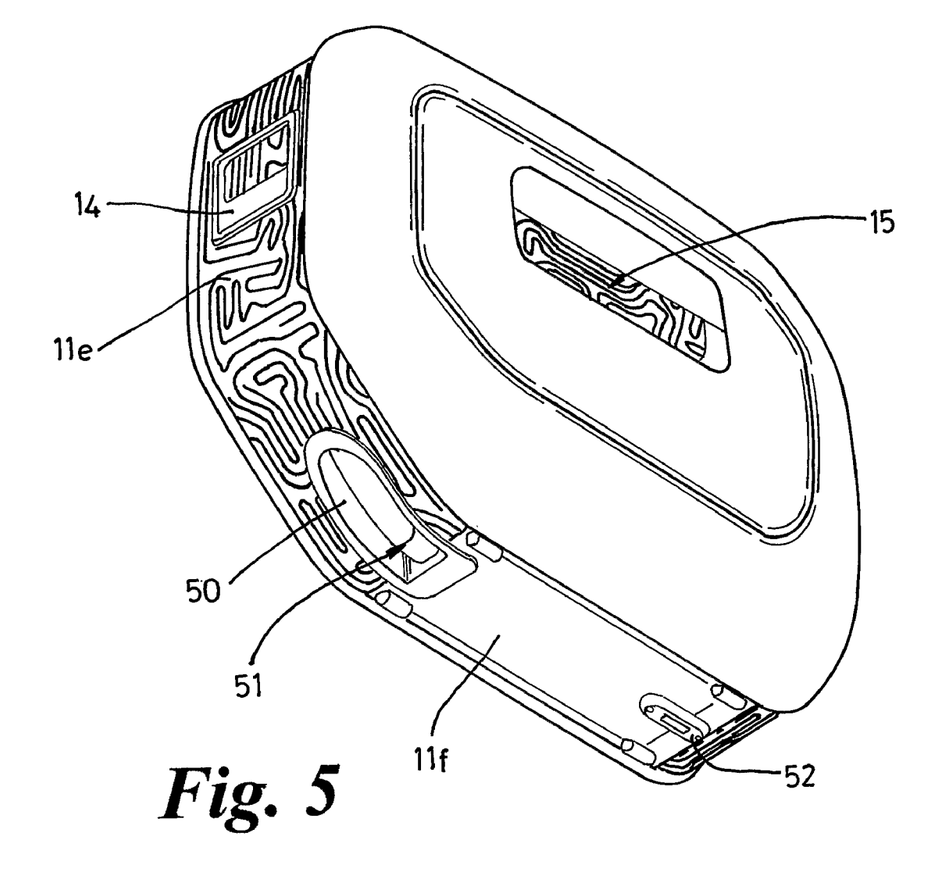
FIG. 5 shows a schematic perspective view of the underside of the fuel cell power unit of FIG. 1.

With reference to FIG. 5, the base 11f of the power unit housing 11 includes a recess 50 containing electrical contacts 51 for electrically coupling the power unit 10 to the vehicle in which it is to be installed. Preferably, the electrical contacts 51 comprise two or more separate power contacts for delivering high current for motive power, and separate control contacts for delivering control signals. However, it will be understood that control signals could alternatively, or in addition, be transmitted between the power unit 10 and a vehicle using modulation signals on the power contacts, or by using an independent wireless link.

The base 11f of the power unit housing 11 also includes a latching point 52 which is adapted to couple with a suitable retaining and ejector mechanism on the vehicle in which it is to be installed, to be described in more detail hereinafter.

Figure 6:
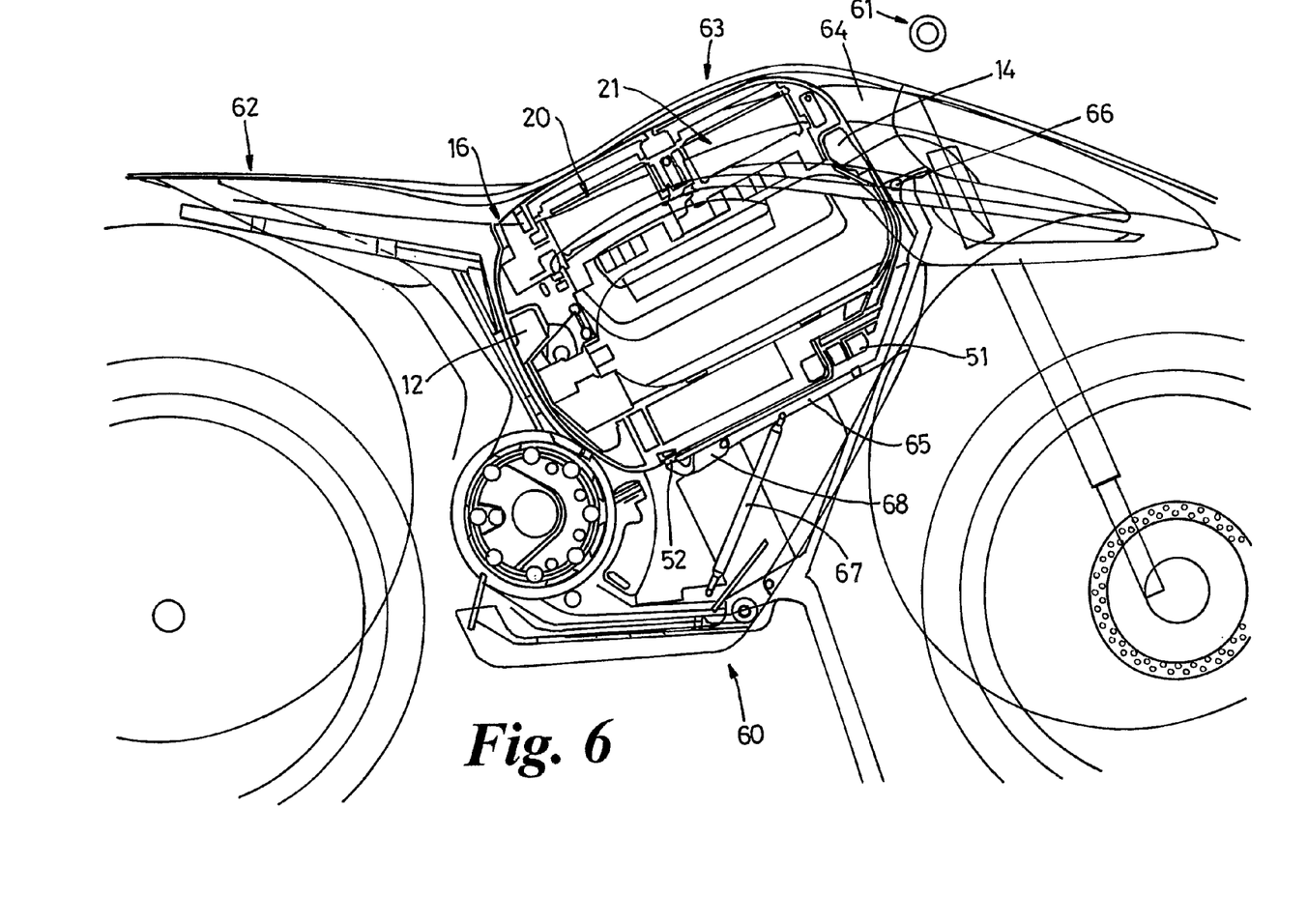
FIG. 6 shows a schematic side view of the fuel cell power unit of FIG. 1 fully installed within, a motor bike.

FIG. 6 shows a schematic side view of the fuel cell power unit 10 fully installed within a bike 60, according to a preferred embodiment. The power unit 10 is positioned within a recess 63 located between the handlebar position 61 and the saddle position 62. In the fully installed position of FIG. 6, it will be noted that the air inlet port 14 is positioned at a leading edge of the power unit and receives air directed thereto by the bike fairing 64, assisted by forward motion of the vehicle 60. Second air inlet 12 is positioned at a trailing edge of the power unit 10 which may also have air directed towards it by appropriate ducting in the side or sides of the fairing 64.

The refueling port 16 is immediately accessible by virtue of its top mounted position on the power unit installed in the recess 63. Thus, the fuel cell may be refilled with hydrogen or other fuel either in situ in the vehicle 60, or when removed from the vehicle.

The power unit 10 rests on a support platform 65 which forms the base of the recess 63. The support platform is hinged at pivot point 66 and moveable about the pivot point 66 by way of a gas powered strut 67 that forms an ejector mechanism. The power unit 10 is engaged with the support platform by way of the latching point 52 which is coupled to a latch 68 in the support platform 65.

Figure 7:
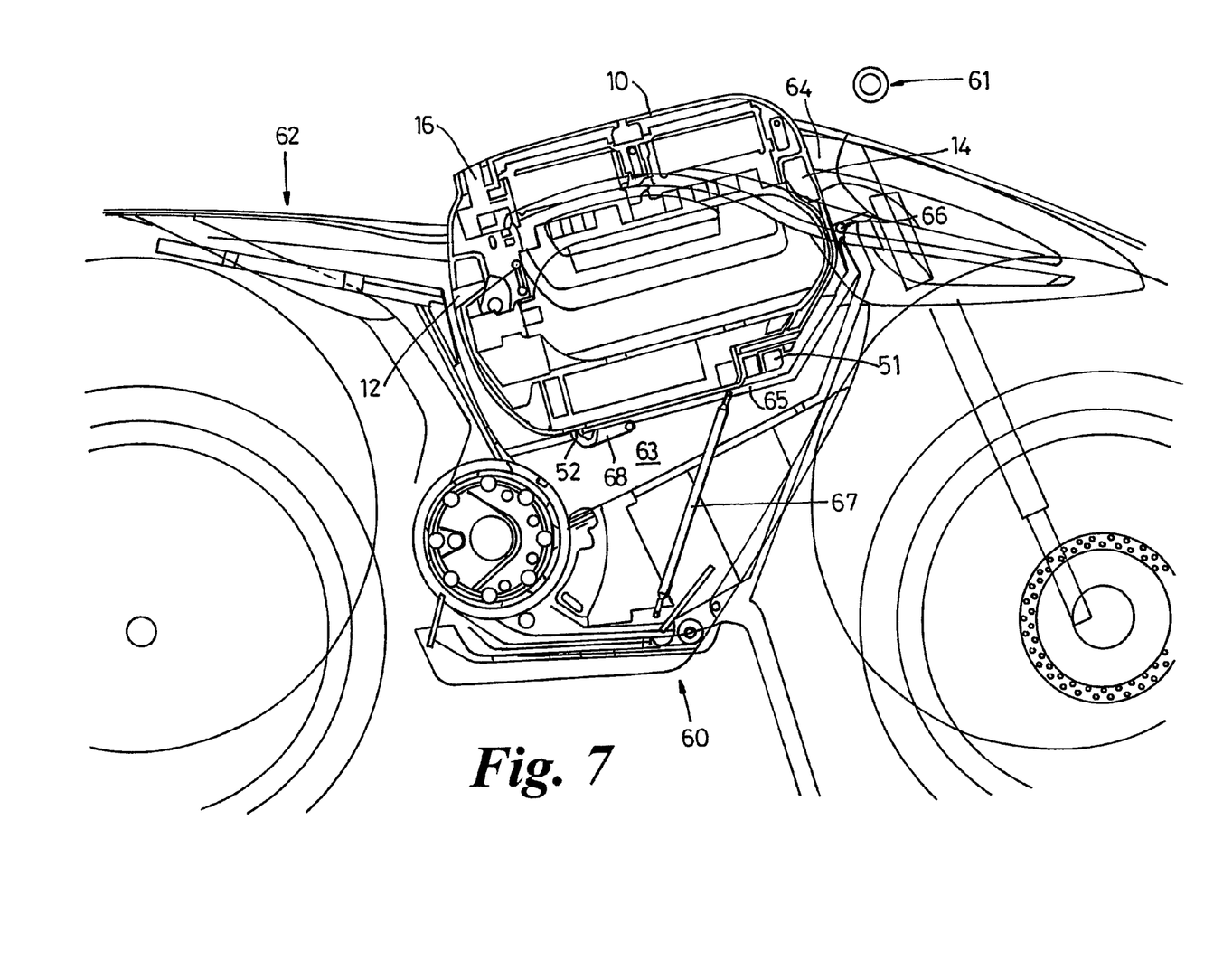
FIG. 7 shows a schematic side view of the fuel cell power unit of FIG. 1 in a partially ejected position within a motor bike.

FIG. 7 shows a corresponding schematic side view of the fuel cell power unit 10 partially ejected from the bike 60. In this partially ejected position, the gas powered strut 67 has lifted the support platform 65 so that it has rotated approximately 15-20 degrees clockwise about pivot point 66 and the fuel cell power unit has consequentially partially emerged from the recess 63. The power unit 10 is still latched to the support platform 65 at this stage.

Figure 8:
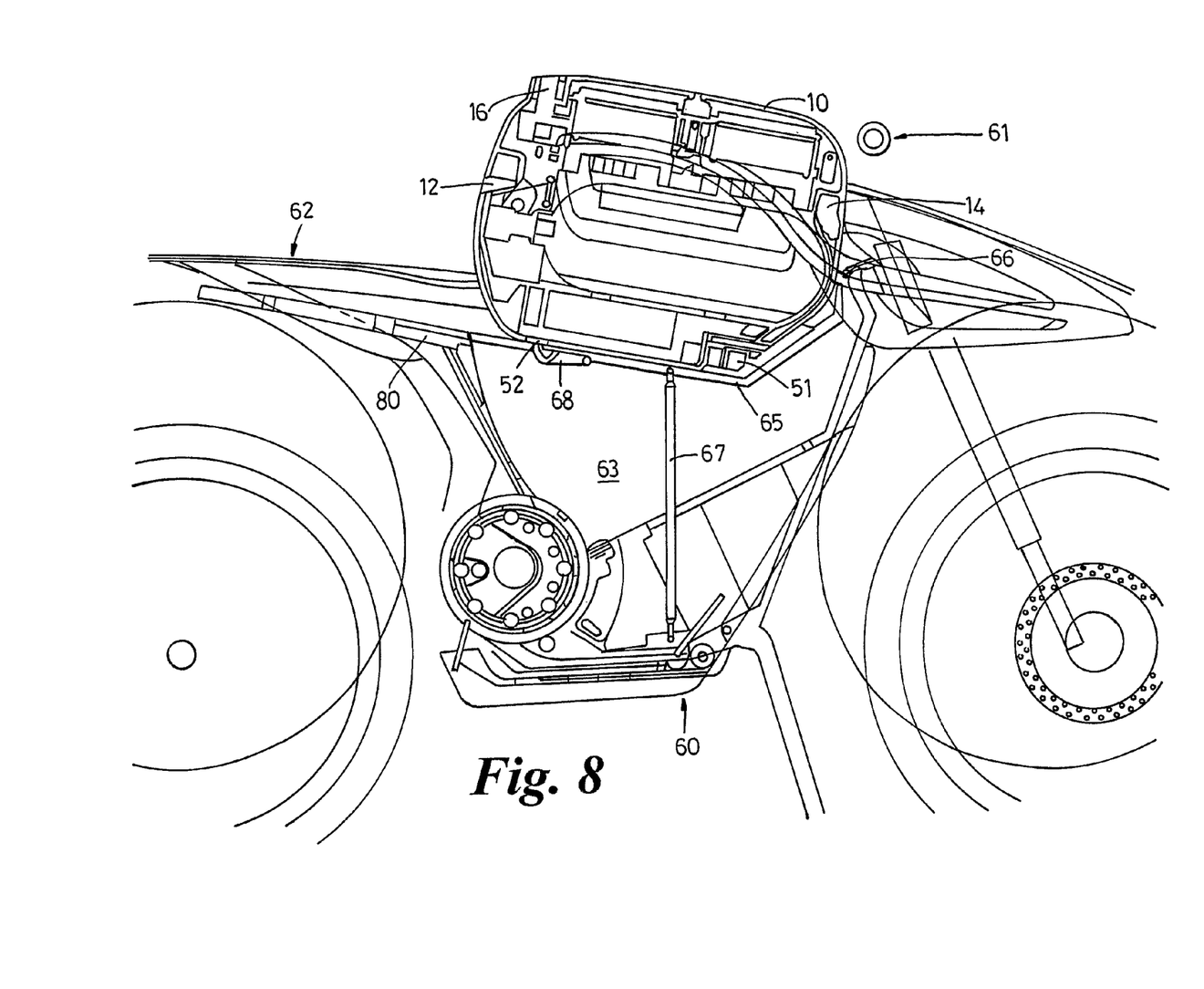
FIG. 8 shows a schematic side view of the fuel cell power unit of FIG. 1 in a fully ejected position on a motor bike ready for removal.

FIG. 8 shows a corresponding schematic side view of the fuel cell power unit 10 fully ejected from the bike 60. In this fully ejected position, the gas powered strut 67 is fully extended to lift the support platform 65 to an upper position in which it is substantially aligned with a support rail 80 adjacent to the saddle position 62 of the bike 60. At this fully ejected position, the latch 68 may be decoupled from the latching point 52 on the power unit 10 (see FIG. 9 which shows the latch decoupled) so that the power unit can be drawn backwards along the support platform 65 and support rail 80. Decoupling the latch may be effected manually as it becomes accessible (see FIG. 8), or more preferably the decoupling may occur automatically when the support platform reaches the fully ejected position.

Figure 9:
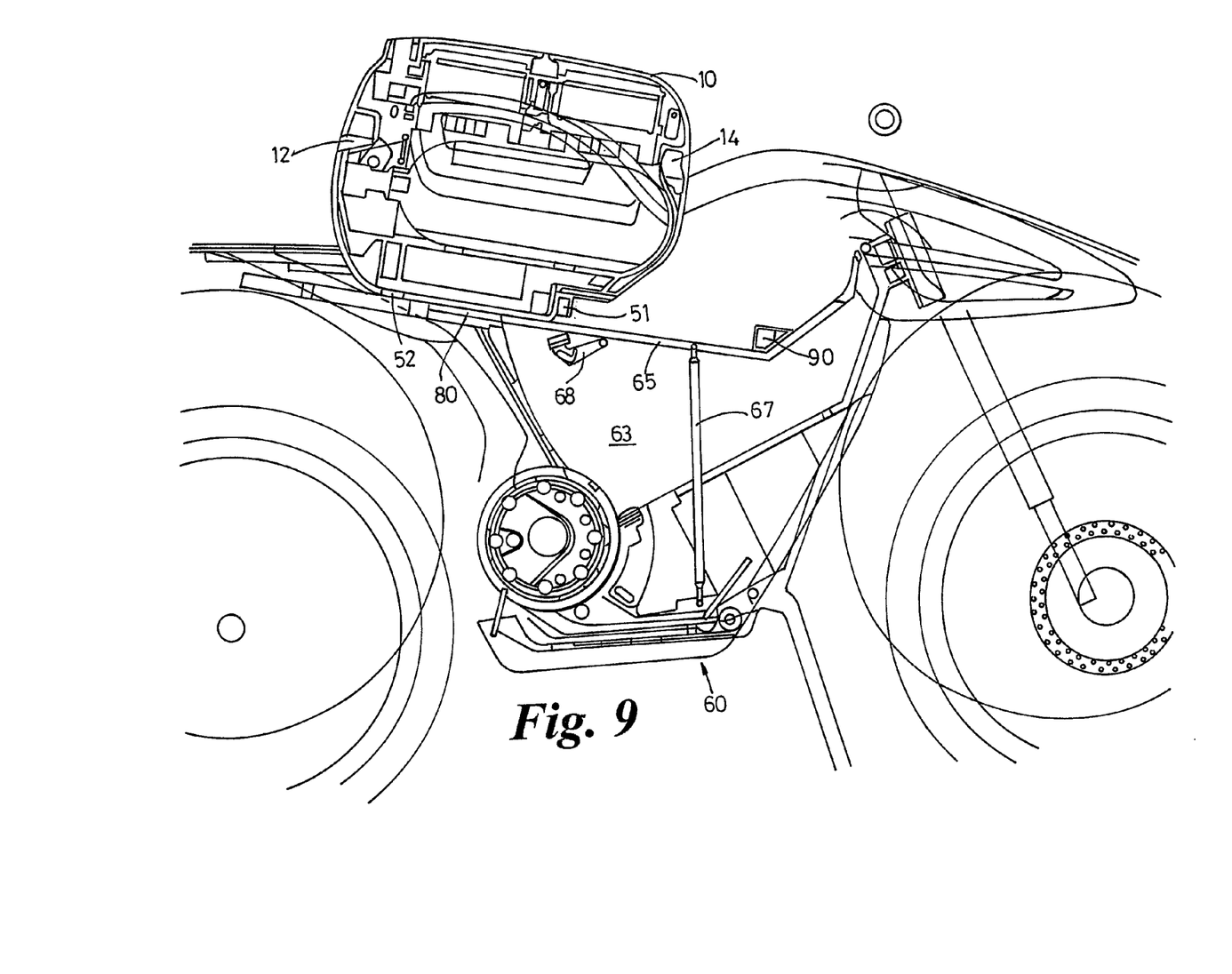
FIG. 9 shows a schematic side view of the fuel cell power unit of FIG. 1 in a fully ejected and partially removed position on a motor bike.

The power unit 10 may be conveniently drawn back from the ejected position of FIG. 8 to the partially removed position of FIG. 9 using the trailing edge handle 12. At this point, the leading edge handle 14 also becomes accessible, and the power unit 10 may be lifted off the bike in its entirety.

It will be noted that the sliding action of the power unit 10 from the fully ejected position of FIG. 8 and the partially removed position of FIG. 9 also results in the decoupling of the electrical contacts 51 on the power unit 10 from corresponding electrical contacts 90 on the bike, which are integrated with the support platform 65.

Figure 10:
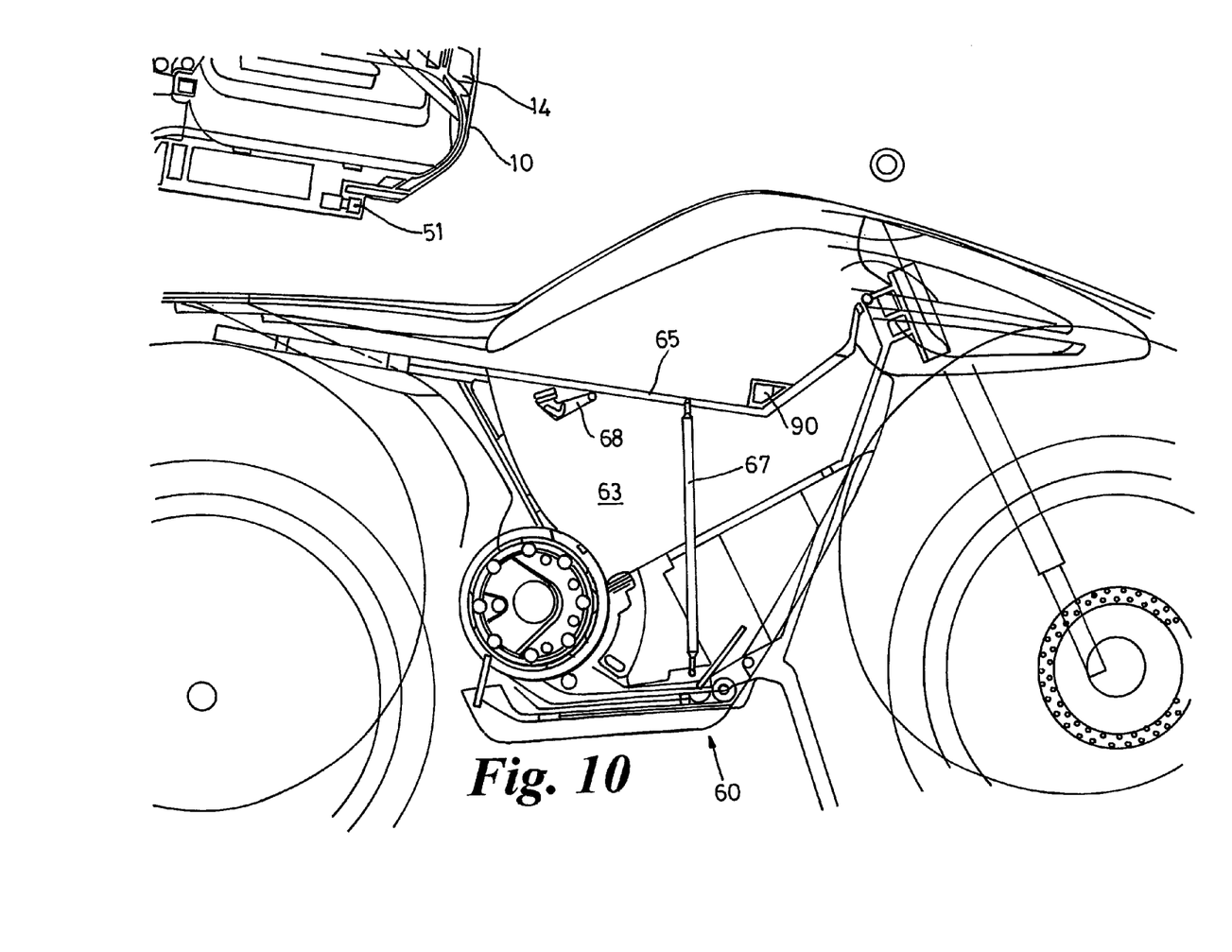
FIG. 10 shows a schematic side view of the fuel cell power unit of FIG. 1 fully removed from the motor bike.

FIG. 10 shows the bike 60 with the fuel cell power unit 10 fully removed.

It will be understood that similar retaining and ejector mechanisms may be provided in other vehicle types, such as any two or more wheeled transport. For larger vehicles, separate recesses 63 may be provided for several power units to improve the power output and/or range of the vehicle. The preferred design described is particularly adapted to provide for quick and easy connect and release from the vehicle.

An important aspect of the preferred power units 10 as described herein is their ability to interface with a plurality of different vehicle types, and the ability to act as independent power sources for other than transportation. For example, the power units 10 may be removed from the vehicle to provide power for camping activities or for domestic electricity, where required. The power units 10 may be provided with separate power outlets of different voltage and/or connection type (not shown), or a trailing socket (possibly with a voltage converter integrated therewith) may be provided which is compatible for physical engagement with the electrical contacts 51.

To ensure that the power units 10 can be used in plural vehicle types and in plural different environments, the fuel cell power units include a microprocessor-based electrical control circuit 23 which is interfaced with a power controller in the vehicle itself. The electrical control circuit 23 performs many functions associated with the proper maintenance of the fuel cells, such as ensuring an appropriate fuel/oxidant ratio, humidification of the anode and cathode plates where required, appropriate limitations on current drain dependent upon the temperature and other operating conditions of the fuel cell. However, the electrical control circuit also interacts with the power controller of the vehicle itself to determine operating conditions of the vehicle itself, to ensure optimum operating conditions of the fuel cells.

For example, when operating under start up conditions, fuel cells require a period of warm up to ensure that electrodes become properly hydrated, before full power demand. Thus, the power controller of the vehicle is instructed, by the electrical control circuit 23, of maximum power or acceleration that may be allowed under the prevailing operating conditions of the fuel cell. In a preferred embodiment, the vehicle will be provided with an auxiliary electrical supply, such as a conventional lead-acid battery, which can serve to provide peak demand for periods when the fuel cell is temporarily unable to service such demand, e.g. during acceleration. The electrical control circuit 23 instructs the power controller of the vehicle of the power available from the fuel cell power unit 10 under the prevailing operating conditions of the fuel cells, so that the vehicle power controller can determine a proportion of power that must be drawn from its auxiliary supply (or limit the vehicle demand if an auxiliary supply is not available or exceeded.

Similarly, for transient high power loads, such as brief acceleration, the vehicle power controller is able to determine what extra power must be drawn from its auxiliary supply in order to ensure that it stays within allowable limits for the fuel cell power unit.

Thus, in a general aspect, the electrical control circuit 23 in the power unit 10 provides to the vehicle an indication of the maximum power that is instantaneously or semi-instantaneously available from the fuel cell at any given time, i.e. the prevailing allowable limits of operation. The prevailing allowable limits vary on a continuous basis, depending upon a number of factors, such as (i) the temperature of the cells, (is) the oxidant and/or cooling air flows available, (iii) the historic demand, and (iv) any other servicing requirements of the fuel cells. For example, in some fuel cells, it is desirable to carry out routine purges of fuel and oxidant gases to maintain the cells in peak condition, predicated by changes in cell voltages. Routine purges can be effected by switching in and out selected stacks in a fuel cell system so that net power output is temporarily diminished only by a relatively small amount.

The vehicle power controller may also be operative to recharge any auxiliary power supply of the vehicle (e.g. lead-acid battery or any other electrochemical battery type) when it determines that the vehicle power demand is less than the present allowable limit of operation of the fuel cell power unit.

The positioning of the fuel cell within the vehicle may be varied according to many alternative design parameters. However, it will be noted that the centrally mounted position, with side venting air flows, on the bike 60 of FIGS. 6 to 10 can advantageously be used to maintain a stream of warmer air proximal to the rider. In other vehicle types, the fuel cell exhaust air stream may be used for space heating purposes.

Other embodiments are intentionally within the scope of the accompanying claims.

The invention claimed is:

1. A fuel cell power unit for a vehicle, the fuel cell power unit comprising a unitary housing containing:
a fuel reservoir for storing fuel;
at least one electrochemical fuel cell stack for delivering electrical power from the fluid fuel;
a refueling port in an outer surface of the housing;
an airflow path extending between a first inlet port on an outer surface of the housing and a first outlet port on an outer surface of the housing, via cathode elements in the at least one fuel cell stack;
a second inlet port on an outer surface of the housing, the second inlet port also being coupled to the airflow path; and,
at least one of the inlet ports and outlet ports comprises a recessed handle for lifting the power unit.

2. The fuel cell power unit of claim 1 in which a first inlet port on a leading edge of the power unit and a second inlet port on a trailing edge of the power unit comprise the recessed handles.

3. The fuel cell power unit of claim 2 in which the refueling port is situated in an upper surface of the power unit.

4. A fuel cell power unit for a vehicle, the fuel cell power unit comprising a unitary housing containing:
a fuel reservoir for storing fuel;
at least one electrochemical fuel cell stack for delivering electrical power from the fluid fuel;
a refueling port in an outer surface of the housing;
an airflow path extending between a first inlet port on an outer surface of the housing and a first outlet port on an outer surface of the housing, via cathode elements in the at least one fuel cell stack;
a second inlet port on an outer surface of the housing, the second inlet port also being coupled to the airflow path;
an electrical control circuit for interfacing with a power controller on the vehicle to which the power unit is to be attached, the control circuit determining allowable operating conditions of the vehicle while the power unit is coupled thereto, via the power controller; and,
the determined operating conditions include one or more of maximum speed, maximum acceleration, and maximum electrical load according to prevailing conditions.

5. A fuel cell power unit comprising a unitary housing containing:
a fuel reservoir for storing fuel;
at least one electrochemical fuel cell stack for delivering electrical power from the fluid fuel;
a refueling port in an outer surface of the housing;
an airflow path extending between a first inlet port on an outer surface of the housing and a first outlet port on an outer surface of the housing, via cathode elements in the at least one fuel cell stack; and,
a latching point on a lower surface of the housing.

6. A fuel cell power unit comprising a unitary housing containing:
a fuel reservoir for storing fuel;
at least one electrochemical fuel cell stack for delivering electrical power from the fluid fuel;
a refueling port in an outer surface of the housing;
an airflow path extending between a first inlet port on an outer surface of the housing and a first outlet port on an outer surface of the housing, via cathode elements in the at least one fuel cell stack; and,
a set of recessed contacts in a lower surface of the housing.

7. A fuel cell power unit comprising a unitary housing containing:
a fuel reservoir for storing fuel;
at least one electrochemical fuel cell stack for delivering electrical power from the fluid fuel;
a refueling port in an outer surface of the housing;
an airflow path extending between a first inlet port on an outer surface of the housing and a first outlet port on an outer surface of the housing, via cathode elements in the at least one fuel cell stack; and,
at least one auxiliary power outlet.

8. A fuel cell power unit for a vehicle, the fuel cell power unit comprising a unitary housing containing:
a fuel reservoir for storing fuel;
at least one electrochemical fuel cell stack for delivering electrical power from the fluid fuel;
a refueling port in an outer surface of the housing;
an airflow path extending between a first inlet port on an outer surface of the housing and a first outlet port on an outer surface of the housing, via cathode elements in the at least one fuel cell stack; and,
an electrically powered vehicle comprising a recess for removably receiving said fuel cell power unit.

9. The fuel cell power unit for a vehicle of claim 8 in which the recess includes a latchable ejector mechanism for lifting the power unit out of the recess.

10. The fuel cell power unit for a vehicle of claim 9 in which the latchable ejector mechanism comprises a support platform for the power unit, the platform including an engagement mechanism for engaging with a latching point on a lower surface of the housing of the power unit.

11. The fuel cell power unit for a vehicle of claim 8 in which the recess includes at least one air duct providing a conduit for air flow from the front of the vehicle to the recess, the air duct positioned for alignment with the inlet port on an outer surface of the housing of the power unit.

12. A fuel cell power unit for a vehicle, the fuel cell power unit comprising a unitary housing containing:
 a fuel reservoir for storing fuel;
 at least one electrochemical fuel cell stack for delivering electrical power from the fluid fuel;
 a refueling port in an outer surface of the housing;
 an airflow path extending between a first inlet port on an outer surface of the housing and a first outlet port on an outer surface of the housing, via cathode elements in the at least one fuel cell stack; and
 a second inlet port on an outer surface of the housing, the second inlet port also being coupled to the airflow path;
 an electrical control circuit for interfacing with a power controller on the vehicle to which the power unit is to be attached, the control circuit determining allowable operating conditions of the vehicle while the power unit is coupled thereto, via the power controller;
 an electrically powered vehicle comprising a recess for removably receiving said fuel cell power unit; and,
said vehicle including a power controller for interfacing with an electrical control circuit in the fuel cell power unit, the power controller operative to determine operating conditions of the vehicle based on allowable limits determined by the electrical control circuit of the fuel cell power unit.

* * * * *